US012158844B2

(12) United States Patent
Amirishetty et al.

(10) Patent No.: US 12,158,844 B2
(45) Date of Patent: Dec. 3, 2024

(54) MAINTAINING TRANSACTIONAL CONSISTENCY IN COLUMNAR ENGINE (71) Applicant: Google LLC, Mountain View, CA (US)

(72) Inventors: Anjan Kumar Amirishetty, Fremont, CA (US); Viral Shah, Cupertino, CA (US)

(73) Assignee: Google LLC, Mountain View, CA (US)

( * ) Notice: Subject to any disclaimer, the term of this patent is extended or adjusted under 35 U.S.C. 154(b) by 14 days.

(21) Appl. No.: 17/951,193

(22) Filed: Sep. 23, 2022

(65) Prior Publication Data

US 2023/0359562 A1 Nov. 9, 2023

Related U.S. Application Data (60) Provisional application No. 63/339,601, filed on May 9, 2022.

(51) Int. Cl.
*G06F 12/08* (2016.01)
*G06F 12/02* (2006.01)
*G06F 12/0815* (2016.01)
*G06F 12/0891* (2016.01)

(52) U.S. Cl.
CPC ...... *G06F 12/0815* (2013.01); *G06F 12/0207* (2013.01); *G06F 12/0891* (2013.01)

(58) Field of Classification Search
CPC .. G06F 12/08; G06F 12/0815; G06F 12/0207; G06F 12/0891

See application file for complete search history.

(56) References Cited

U.S. PATENT DOCUMENTS

| 9,606,921 B2 * | 3/2017 | Kamp | G06F 12/0815 |
| 2014/0310232 A1 * | 10/2014 | Plattner | G06F 16/24539 |
| | | | 707/602 |
| 2014/0317084 A1 | 10/2014 | Chaudhry et al. | |
| 2015/0088824 A1 | 3/2015 | Kamp et al. | |

(Continued)

OTHER PUBLICATIONS

Tianyu Li, Matthew Butrovich, Amadou Ngom, Wan Shen Lim, Wes McKinney, Andrew Pavlo, "Mainlining Databases: Supporting Fast Transactional Workloads on Universal Columnar Data File Formats", https://doi.org/10.48550/arXiv.2004.14471, Apr. 29, 2020.*

(Continued)

*Primary Examiner* — Pierre Michel Bataille
(74) *Attorney, Agent, or Firm* — Lerner David LLP (57) ABSTRACT

Aspects of the disclosure are directed to maintaining transaction consistency when using a columnar cache. The columnar cache can be initially loaded with all-visible data, and as the data gets modified, respective data is invalidated in the columnar cache. As more data gets invalidated in the columnar cache, respective data can be refreshed in the columnar cache. As part of the refresh, the latest all-visible data can be populated while the queries are still using the old data in the columnar cache. When all the queries transition to use the newly populated data, old data can be removed from the columnar cache. A query can use valid blocks of columnar cache and go to a row store for invalid blocks. When a query starts to use the columnar cache, a request can be submitted to asynchronously prefetch the invalid blocks from the row store.

20 Claims, 7 Drawing Sheets

(56) References Cited

U.S. PATENT DOCUMENTS

| | | | |
|---|---|---|---|
| 2015/0091920 A1* | 4/2015 | Rygh | G06T 1/60 |
| | | | 345/522 |
| 2017/0116280 A1* | 4/2017 | Shergill, Jr. | G06F 16/2272 |
| 2017/0344481 A1 | 11/2017 | Pack, III | |
| 2023/0141902 A1* | 5/2023 | Ma | G06F 16/24524 |
| | | | 707/718 |

OTHER PUBLICATIONS

G. Kurian, Q. Shi, S. Devadas and O. Khan, "Osprey: Implementation of Memory Consistency Models for Cache Coherence Protocols involving Invalidation-Free Data Access," 2015 International Conference on Parallel Architecture and Compilation (PACT), San Francisco, CA, USA, 2015, pp. 392-405.*

T. Yoshimura, T. Chiba and H. Horii, "Column Cache: Buffer Cache for Columnar Storage on HDFS," 2018 IEEE International Conference on Big Data (Big Data), Seattle, WA, USA, 2018, pp. 282-291.*

K. Nguyen, K. Lyu, X. Meng, V. Sridharan and X. Jian, "Nonblocking Memory Refresh," 2018 ACM/IEEE 45th Annual International Symposium on Computer Architecture (ISCA), Los Angeles, CA, USA, 2018, pp. 588-599.*

B. Pourshirazi and Z. Zhu, "Refree: a Refresh-Free Hybrid DRAM/PCM Main Memory System," 2016 IEEE International Parallel and Distributed Processing Symposium (IPDPS), Chicago, IL, USA, 2016, pp. 566-575.*

Ghandeharizadeh et al. SQL Query to Trigger Translation: a Novel Consistency Technique for Cache Augmented SQL Systems. Jan. 11, 2013 (Jan. 11, 2013), 30 pages. Retrieved from the Internet: <http://citeseerx.ist.psu.edu/viewdoc/download?doi=l0.1.1.308.6150 &rep=repl&type=pdf>.

Gupta et al. A Trigger-Based Middleware Cache for ORMs. Dec. 12, 2011 (Dec. 12, 2011), SAT 2015 18th International Conference, Austin, TX, USA, Sep. 24-27, 2015; [Lecture Notes in Computer Science; Lect.Notes Computer], Springer, Berlin, Heidelberg, pp. 329-349.

International Search Report and Written Opinion for International Application No. PCT/US2023/017831 dated Jul. 25, 2023. 15 pages.

\* cited by examiner

MAINTAINING TRANSACTIONAL CONSISTENCY IN COLUMNAR ENGINE

CROSS-REFERENCE TO RELATED APPLICATIONS

The present application claims the benefit of the filing date of U.S. Provisional Patent Application No. 63/339,601, filed May 9, 2022, the disclosure of which is hereby incorporated herein by reference.

BACKGROUND

A database management system (DBMS) is a system for managing one or more databases as well as for receiving and resolving queries to the managed databases. A DBMS can manage one or more tables or relations of data stored on one or more storage devices and forming part of one or more managed databases. The DBMS can read and write to individual rows or columns of the managed tables, including updating, deleting, and adding records.

A DBMS can implement a cache for temporarily storing database data. The cache can store blocks of data representing rows of a base database table. Data in the cache can be stored in column-major or row-major format. Elements of a table stored in column-major format are stored contiguously in memory by column, while elements stored in row-major format are stored contiguously in memory by row. A cached block is invalidated when corresponding blocks of the base table from which the cache block is retrieved are modified after caching the block. The invalidated block no longer reflects the data updated in the base table from which the data is cached.

A database cache in which data is stored in column-major format is a columnar cache. A columnar cache can serve analytical queries efficiently by caching subsets of tables/columns in column-major format in memory. The columnar cache can be specifically suitable for a database which persists the table in row-major format. The columnar cache can improve performance by accessing only the relevant columns with better compression support and using vectorized execution. The columnar cache can store the data in terms of table fragments, which are virtual horizontal partitioning of row-major data. The rows of several contiguous blocks are converted into column-major format, resulting in an independent, and self-describing table fragment. Within the table fragment, all the values of a column are stored together physically to enable faster predicate filtering and aggregations.

Multi-version currency control (MVCC) can create a new version of a data item for every write. With MVCC in a DBMS, each structured query language (SQL) statement sees a snapshot of data, e.g., a database version, as it was some time ago, regardless of the current state of the underlying data. This prevents statements from viewing inconsistent data produced by concurrent transactions performing updates on the same data rows, providing transaction isolation for each database session. MVCC, by eschewing the locking methodologies of traditional DBMSs, minimizes lock contention in order to allow for reasonable performance in multiuser environments. The main advantage of using the MVCC model of concurrency control rather than locking is that in MVCC locks acquired for querying, e.g., reading, data do not conflict with locks acquired for writing data, and so reading never blocks writing and writing never blocks reading.

With the addition of columnar cache to the DBMS, data is cached in columnar cache in columnar-format. As the data is concurrently modified, the transactions performing the read of columnar cache need to see the transactionally consistent data, honoring the isolation level of the transaction.

BRIEF SUMMARY

Aspects of the disclosure are directed to maintaining transaction consistency when using a columnar cache. At any point of time, the columnar cache can contain only data that is visible to all of the ongoing transactions in the database system. The columnar cache can be initially loaded with all-visible data, and as the data gets modified, respective data is invalidated in the columnar cache. As more data gets invalidated in the columnar cache due to modifications performed by a user after the initial load, respective data can be refreshed in the columnar cache. As part of the refresh, the latest all-visible data can be populated while the queries are still using the old data in the columnar cache. When all the queries transition to use the newly populated data, old data can be removed from the columnar cache. Invalidations can be performed at a block level of the columnar cache. If a block is valid in the columnar cache, that block can contain only all-visible data. A query can use valid blocks of columnar cache and go to a row store for invalid blocks. When a query starts to use the columnar cache, a request can be submitted to asynchronously prefetch the invalid blocks from the row store.

An aspect of the disclosure provides for a method for maintaining transactional consistency when retrieving data from a columnar cache. The method includes loading, with one or more processors, the columnar cache with a first plurality of blocks corresponding to data; invalidating, with the one or more processors, one or more blocks of the first plurality of blocks when data corresponding to the one or more blocks is modified in a corresponding row store; and refreshing, with the one or more processors, the columnar cache with a second plurality of blocks corresponding to the modified data to replace the invalidated blocks.

In an example, the first plurality of blocks includes valid blocks corresponding to all-visible data. In another example, the method further includes performing, with the one or more processors, a row store operation to retrieve data for an invalidated block. In yet another example, the method further includes prefetching, with the one or more processors, the modified data from a row store.

In yet another example, the method further includes determining, with the one or more processors, to refresh the columnar cache based on an effectiveness of the columnar cache. In yet another example, an effectiveness of the columnar cache is based on whether the columnar cache is consistently not chosen for retrieving data a predetermined number of times. In yet another example, the columnar cache is not chosen based on a number of invalidated blocks in the columnar cache.

Another aspect of the disclosure provides for a system including one or more processors; and one or more storage devices coupled to the one or more processors and storing instructions that, when executed by the one or more processors, causes the one or more processors to perform operations for maintaining transactional consistency when retrieving data from a columnar cache. The operations include loading the columnar cache with a first plurality of blocks corresponding to data; invalidating one or more blocks of the first plurality of blocks when data corresponding to the one or more blocks is modified in a corresponding row store; and refreshing the columnar cache with a second plurality of blocks corresponding to the modified data to replace the invalidated blocks.

In an example, the first plurality of blocks includes valid blocks corresponding to all-visible data. In another example, the operations further include performing a row store operation to retrieve data for an invalidated block. In yet another example, the operations further include prefetching the modified data from a row store.

In yet another example, the operations further include determining to refresh the columnar cache based on an effectiveness of the columnar cache. In yet another example, an effectiveness of the columnar cache is based on whether the columnar cache is consistently not chosen for retrieving data a predetermined number of times. In yet another example, the columnar cache is not chosen based on a number of invalidated blocks in the columnar cache.

Yet another aspect of the disclosure provides for a non-transitory computer readable medium for storing instructions that, when executed by one or more processors, causes the one or more processors to perform operations for maintaining transactional consistency when retrieving data from a columnar cache. The operations include loading the columnar cache with a first plurality of blocks corresponding to data; invalidating one or more blocks of the first plurality of blocks when data corresponding to the one or more blocks is modified in a corresponding row store; and refreshing the columnar cache with a second plurality of blocks corresponding to the modified data to replace the invalidated blocks.

In an example, the first plurality of blocks includes valid blocks corresponding to all-visible data. In another example, the operations further include performing a row store operation to retrieve data for an invalidated block. In yet another example, the operations further include prefetching the modified data from a row store.

In yet another example, the operations further include determining to refresh the columnar cache based on an effectiveness of the columnar cache. In yet another example, an effectiveness of the columnar cache is based on whether the columnar cache is consistently not chosen for retrieving data a predetermined number of times. In yet another example, the columnar cache is not chosen based on a number of invalidated blocks in the columnar cache.

DETAILED DESCRIPTION

Generally disclosed herein are implementations for maintaining transactional consistency when using a columnar cache. At any point of time, the columnar cache can contain only data that is visible to all of the ongoing transactions in the database system, e.g. the columnar cache only can contain all-visible data. Data that is visible can correspond to a version of data that would be retrieved in response to a read request for a transaction related to that data. All-visible data can correspond to a version of data that is visible to current and future transactions in a database system. The columnar cache can be initially loaded with such all-visible data, and as data gets modified, respective data can be invalidated in the columnar cache as the respective data would no longer be all-visible data. Even though multi-version currency control (MVCC) requires maintaining multiple versions of the data, the columnar cache only needs to contain one version.

As more data gets invalidated in the columnar cache due to modifications performed by a user after the initial load, effectiveness of the columnar cache can decrease, and a query planner can stop choosing the columnar cache for serving queries. When the query planner does not choose the columnar cache for a predetermined number of times, due to a large number of invalid blocks, respective data can be refreshed in the columnar cache. This refresh can be transparent to ongoing queries. As part of the refresh, the latest all-visible data can be populated while the queries are still using the old data in the columnar cache. When all the queries transition to use the newly populated data, old data can be removed from the columnar cache. This refresh can be performed periodically in the background. Each table fragment can be independently refreshed.

Invalidations can be performed at a block level of the columnar cache. With block level invalidation, data can be marked as valid/invalid at the level of block in columnar cache. If a block is valid in the columnar cache, that block can contain only all-visible data. If a block does not contain all-visible data, that block is marked as invalid in the columnar cache. A query can use valid blocks of columnar cache and go to a row store for invalid blocks. When a query starts to use the columnar cache, a request can be submitted to asynchronously prefetch the invalid blocks from the row store.

With the implementations generally disclosed herein, a columnar cache is no longer required to be multi-versioned; instead, the columnar cache can contain only an all-visible data version. However, the columnar cache can still provide multi-version capabilities by reading invalid blocks from a buffer cache and patching the result set of the read query. Significant memory saving can result as only one version can be maintained in the columnar cache. Block level invalidation can simplify the implementation and can reduce an amount of metadata required for the column cache.

Figure 1:
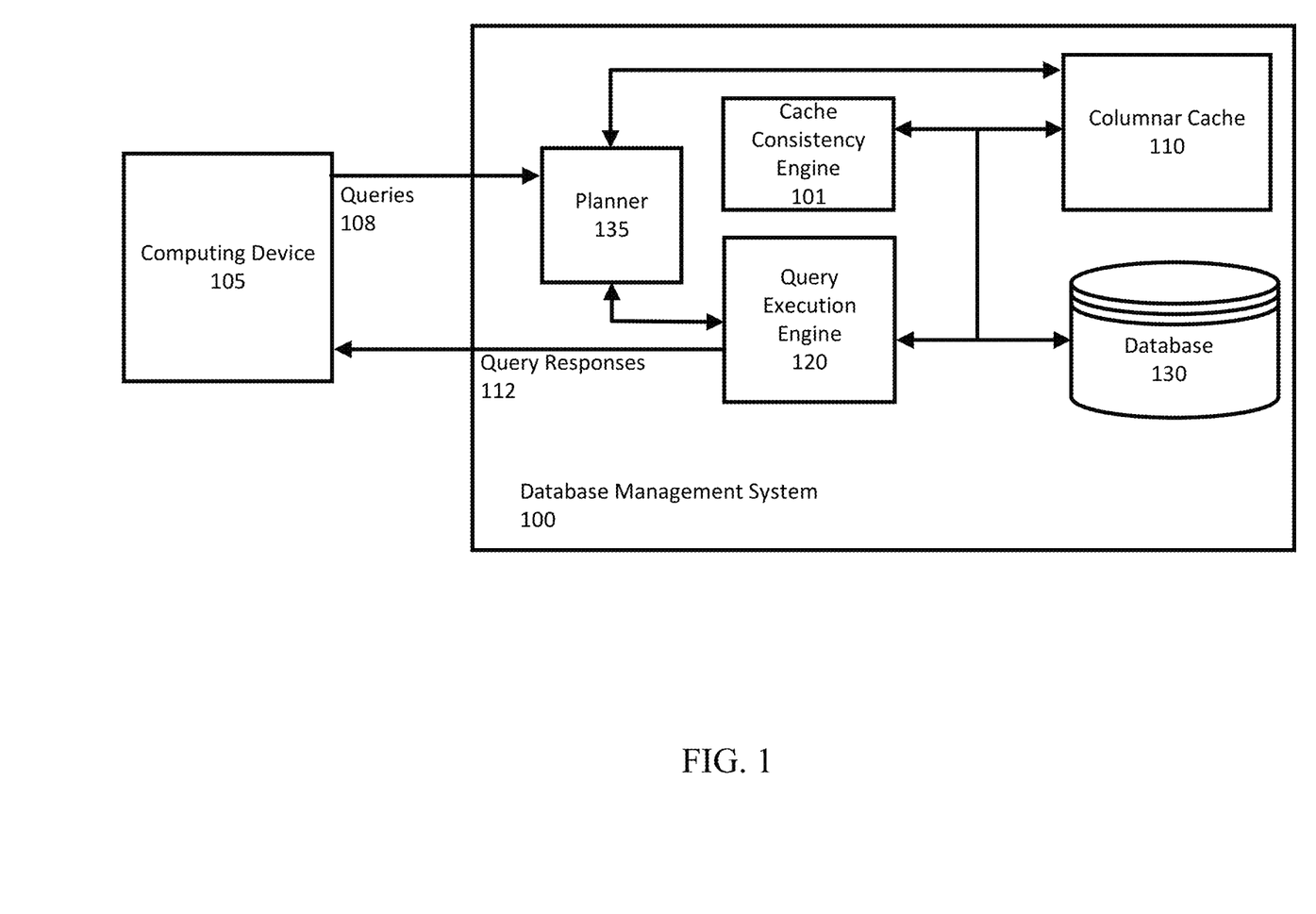
FIG. 1 depicts a block diagram of an example database management system (DBMS) configured to maintain transactional consistency when using a columnar cache according to aspects of the disclosure.

FIG. 1 depicts a block diagram of an example database management system (DBMS) 100 configured to maintain transactional consistency when using a columnar cache. The DBMS 101 can be implemented on one or more computing devices in one or more physical locations. For example, the DBMS 101 can be configured for managing data on a computing platform of computing devices, which may include a number of computing devices and/or storage devices. The DBMS 100 can include a cache consistency engine 101, a columnar cache 110, a query execution engine 120, and a database 130.

The DBMS 100 can be configured to receive queries, such as queries 108 from computing device 105, and resolve queries by providing responses, such as query responses 112. A query response can include one or more rows or columns, or portions of one or more rows or columns, of one or more tables of the database 130. Before providing the query response, the DBMS 100 can optionally process the data, for example by sorting the rows of the response. Operations for processing the query response can be provided as part of a received query, and/or be part of a predetermined pipeline that the DBMS 100 is configured to execute as part of resolving a query.

The computing device 105 can be any of a variety of computing devices configured for querying a database. For example, the computing device 105 can be a personal laptop, a server, a wearable device, a sensor, etc. The computing device 105 can be user-operated and include peripherals or other components for receiving user input. In other examples, the computing device 105 can be configured to automatically communicate with the DBMS 100, for example as part of executing a computer program, script, or hardware/firmware operation by the computing device 105. The DBMS 101 and the computing device 105 can communicate over a network and/or any of a variety of different types of wired or wireless connections.

In some examples, the DBMS 100 can be a hybrid transactional and analytical processing system (HTAP). An HTAP system is a database management system configured to perform both online transaction processing (OTAP) and online analytical processing (OLAP). OTAP systems are configured to coordinate and execute transactions between communicating computing devices. Transactions are recorded and updated in a corresponding database managed by an OTAP system. OLAP systems are configured to receive and resolve queries to a database used as part of analysis of data stored in the database. OLAP and OTAP systems are separately optimized for their respective use cases, with OLAP systems generally optimized for read-only access of data, and OTAP systems optimized for read and write access of queried data.

To improve the performance of query resolution, the DBMS 100 can implement the columnar cache 110. Queries to OLAP systems and HTAP systems supporting OLAP may include requests for data referenced by columns of tables in the database, as opposed to references to individual rows, which is more common in OTAP. To speed up resolution of queries by column, the DBMS 100 can implement the columnar cache 110.

The columnar cache 110 can be implemented asynchronously, so occasionally the columnar cache 110 can contain stale data, referred to as invalidated blocks. At least for some applications, such as HTAP systems, the system should answer queries and at the same time accept updates to base tables from which data is cached. The DBMS 100 can implement a hybrid query execution to allow for the use of asynchronous columnar caches, by allowing for the execution of queries for which data is retrieved from both the columnar cache 110 and the database 130.

Figure 2:
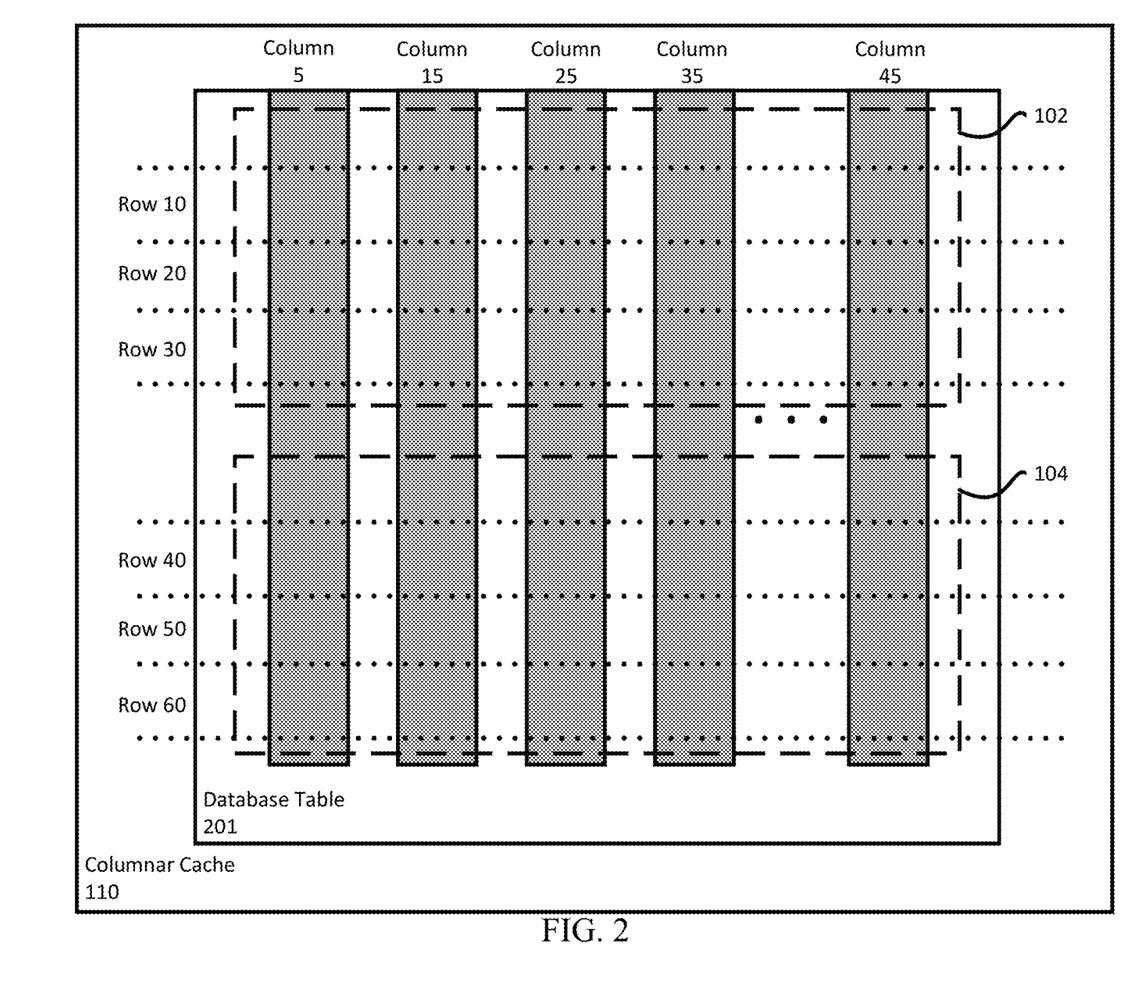
FIG. 2 depicts a block diagram of the columnar cache with cached data according to aspects of the disclosure.

FIG. 2 depicts a block diagram of the columnar cache 110 with cached data. In FIG. 2, the columnar cache 110 is shown as caching portions of a database table 201. Columns 5, 15, 25, 35, and 45 in the columnar cache 110 can be referenced using a respective table fragment index and a row index. A group of rows can form a block of data. Each block of data 102, 104 has a respective index. Within each block 102, 104, each row of the table fragment has a respective row index. Each row, such as row 10, row 20, and row 30, of block 102 can be referenced according to a respective row index. Similarly rows 40, 50, and 60 can be referenced according to a respective row index. Multiple blocks of data can be referred to as a table fragment. The number of blocks for a table fragment can vary from implementation-to-implementation depending on performance and overhead requirements, for example 4096 blocks each. It should be noted that the columnar cache can include any number of rows, columns, blocks, table fragments, etc., and the number of elements shown in FIG. 2 is for example purposes only.

The columnar cache 110 can include any of a variety of different types of memory devices used for caching data. For example, the columnar cache can be implemented in main memory, such as RAM or DRAM. In addition, or alternatively, the columnar cache 110 can be implemented in persistent storage, such as on a solid-state drive or on a hard drive.

Referring back to FIG. 1, the database 130 can be a collection of tables or relations storing data along multiple dimensions. For example, a table of the database 130 can store data along rows and columns of the table. The database 130 can be implemented on storage devices, such as directed attached storage devices, including solid state drives, hard drives, flash drives, network attached storage devices, arrays of various combinations of different or the same storage devices, etc.

The query execution engine 120 can be configured to generate query responses 112 based on received queries 108. The queries 108 can be part of a workload executed by the computing device 105, or some other device not shown. A workload can refer to one or more computer programs or scripts that include operations for querying the DBMS 100 for data. A workload can be automatic and on-going, or executed during pre-programmed intervals of time. In other examples, a workload is executed on-demand by the computing device 105, for example in response to user input to the device 105.

A query 108 to the DBMS 100 can include data specifying columns of data to be retrieved from the DBMS 100. The specified data can be stored in the columnar cache 110 or in the database 130 at the time of execution. The query execution engine 120 can be configured to retrieve the queried data specified in a given query and return the data as part of a query response 112.

The DBMS 100, as part of resolving the query 108, is configured to generate a query execution plan. The DBMS 100 can include a planner 135 or communicate with a planner external to the DBMS 100 (not shown). Based on receiving one or more queries 108, the planner 135 can generate a query execution plan according to any of a variety of different processes. As part of generating the query execution plan, the planner 135 can parse a received query 108 and select corresponding query operations to execute according to the plan, based on a number of predetermined criteria. The predetermined criteria can be, for example, based on efficient use of compute or storage resources, number of operations to perform, total time to execute the query, user input specifying certain types of operations to perform, etc. The planner 135 can receive and parse a query 108 to generate a query execution plan.

A query operation can refer to an action performed by the query execution engine 120 as part of executing or resolving the received query 108. A query operation can include reading or writing data from or to memory, performing arithmetic or logic calculations, or performing a respective process for sorting, hashing, joining, and scanning data, etc. The query execution plan can be a directed graph, such as a tree, of nodes representing different operations to be performed by the DBMS 100 as part of executing the query 108. The query execution plan can also be represented as an ordered list or array of operations, based on the order in which the operations of the plan must be executed to correctly execute the received and parsed query 108.

Query responses 112 generated by the query execution engine 120 are returned to the computing device 105. In some examples, query responses 112 can be returned to another destination computing device (not shown) that can be specified as a destination by the computing device 105. The computing device 105 can proceed to process the query responses 112 as part of a downstream process, which can include subsequent queries to the DBMS 100 as part of the same or a different workload.

The DBMS 100 can communicate data between the computing device 105 and/or another computing device (not shown), using an interface, such as a graphic user instance, displayed on a display of the computing device 105. The interface can include a number of user-interactable elements, such as buttons, toggles, sliders, checkboxes, etc., for modifying the behavior of the DBMS 100 and/or displaying certain types of information, described presently. In other examples, the interface can include an API exposing the DBMS 100 for modifying different parameters related to the functionality of the DBMS 100, such as cache configuration, according to calls to the API.

The DBMS 101 can implement a cache consistency engine 101 to maintain cache coherence between the columnar cache 110 and the database 130. The cache consistency engine 101 can be configured to ensure the columnar cache 110 contains data that is visible or committed for ongoing transactions, e.g., queries 108 and responses 112, in the DBMS 100. As data gets modified, e.g., overwritten or deleted, the block in the columnar cache 110 representing the modified data can be or become invalid. The cache consistency engine 101 can flag blocks of data as "invalid" or "valid" bits to identify the blocks as invalid or valid. When a block is invalidated, the DBMS 100 can perform a row-store operation, such as retrieving the data from database 130, to read the modified data, instead of retrieving the data from the columnar cache 110. For invalid blocks, the cache consistency engine 101 can asynchronously prefetch the invalid blocks from the row store to store in a separate cache from the columnar cache 110, such as a buffer cache or file system cache (not shown). The cache consistency engine 101 allows for ensuring only one version of data needs to be maintained in the columnar cache 110 while data can still be retrieved quickly and accurately.

As more data gets invalidated in the columnar cache due to modifications, effectiveness of the columnar cache can decrease, and the query planner 135 or query execution engine 120 can stop choosing the columnar cache 110 for serving queries. When the query planner 135 does not choose the columnar cache 110 for a predetermined number of times, due to a large number of invalid blocks, the columnar consistency engine 101 can refresh respective data in the columnar cache 110. This refresh can be transparent to ongoing queries. As part of the refresh, the latest all-visible or committed data can be populated in the columnar cache 110 while the queries 108 are still using the old data in the columnar cache 110. When all the queries transition to use the newly populated data, the cache consistency engine 101 can remove the old data from the columnar cache 110. This refresh can be performed periodically in the background when the query planner 135 does not choose the columnary cache 110 for the predetermined number of times. Each table fragment can be independently refreshed.

Figure 3:
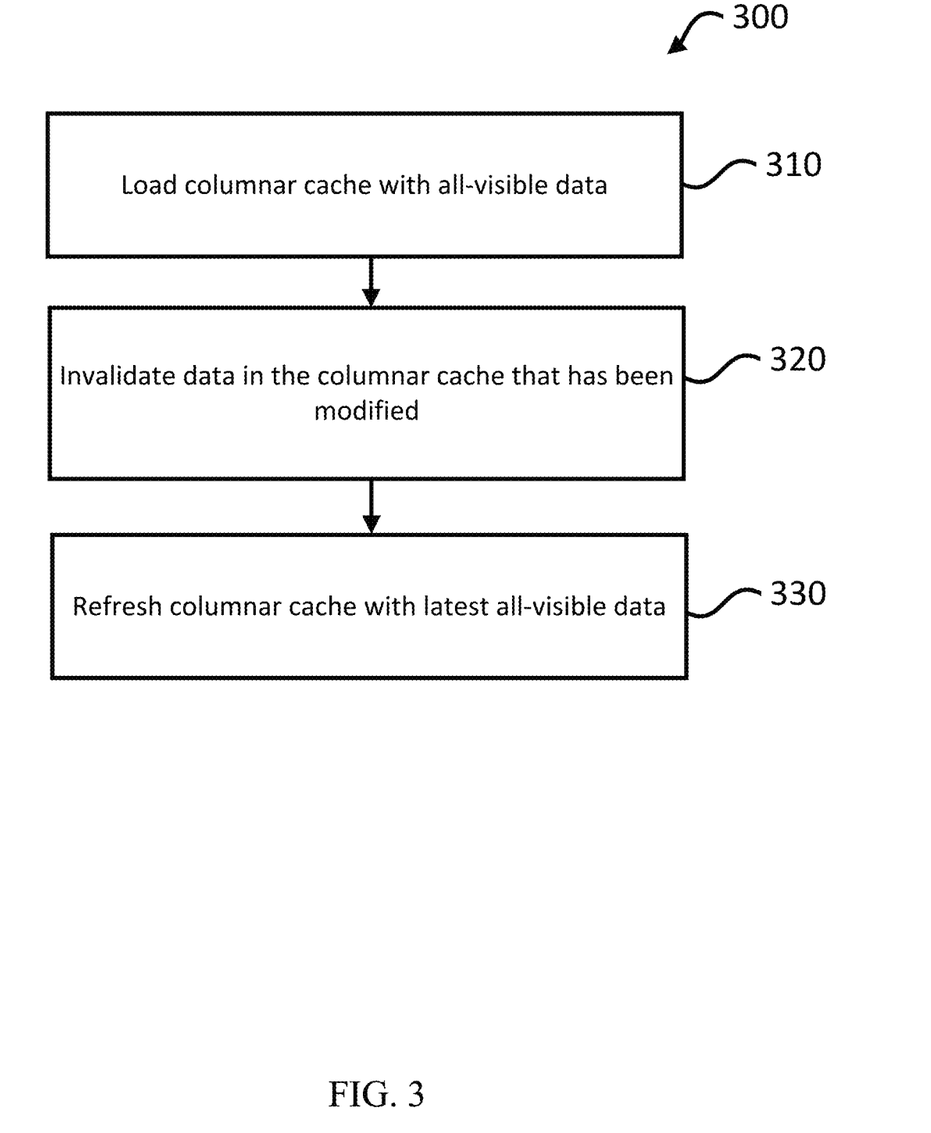
FIG. 3 depicts a flow diagram of an example process for maintaining transactional consistency when using a columnar cache according to aspects of the disclosure.

FIG. 3 depicts a flow diagram of an example process 300 for maintaining transactional consistency when using a columnar cache. The example process 300 can be performed on a system of one or more processors in one or more locations, such as the example DBMS 100 of FIG. 1. At any point of time, the columnar cache 110 can contain data that is all-visible to the ongoing transactions in the DBMS 100.

Figure 4:
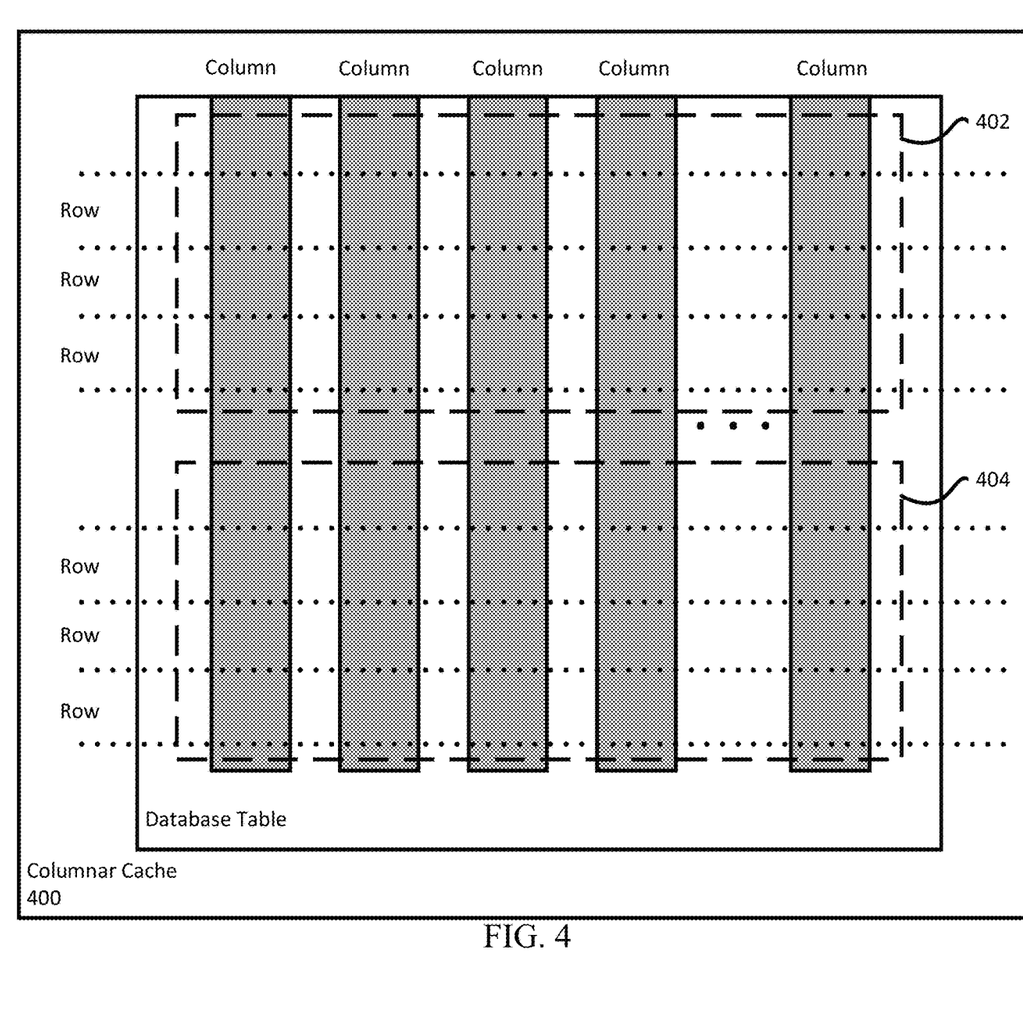
FIG. 4 depicts an example columnar cache with committed blocks of data according to aspects of the disclosure.

As shown in block 310, the cache consistency engine 101 can load the columnar cache 110 with all-visible data. FIG. 4 depicts an example columnar cache 400 with all-visible blocks of data 402, 404. While only two blocks of data are shown for simplicity, it should be noted that the columnar cache can include any number of blocks of data forming any number of table fragments.

Figure 5:
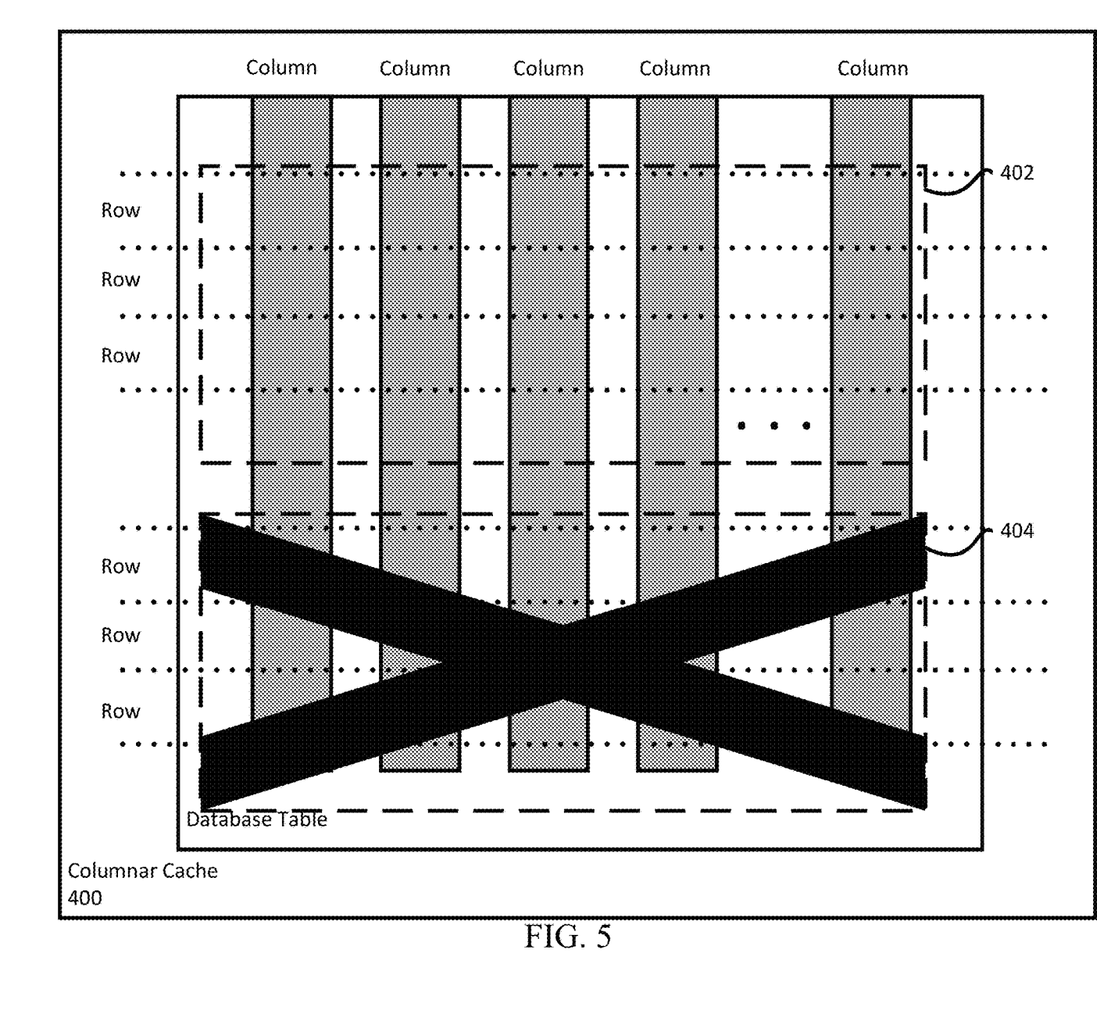
FIG. 5 depicts the example columnar cache with some invalidated data according to aspects of the disclosure.

As shown in block 320, as data gets modified through transactions, the cache consistency engine 101 invalidates respective data in the columnar cache 110. The cache consistency engine 101 can perform invalidations at a block level of the columnar cache 110. With block level invalidation, data can be marked as valid/invalid at the level of block in the columnar cache 110. FIG. 5 depicts the example columnar cache 400 where block 404 has been invalidated. The invalidated data is illustrated by a cross. The query execution engine 120 can retrieve data from valid blocks of the columnar cache 110 and can retrieve data from a row store of the database 130 for invalid blocks of the columnar cache 110. To increase the speed at which data is retrieved, the cache consistency engine 101 can prefetch invalid blocks from the row store of the database 130. An invalid block can be prefetched if that invalid block is not filtered by a predicate in the query, for example the WHERE clause. Invalid blocks can be prefetched into a separate cache from the columnar cache 110, such as a buffer cache or file system cache.

Figure 6:
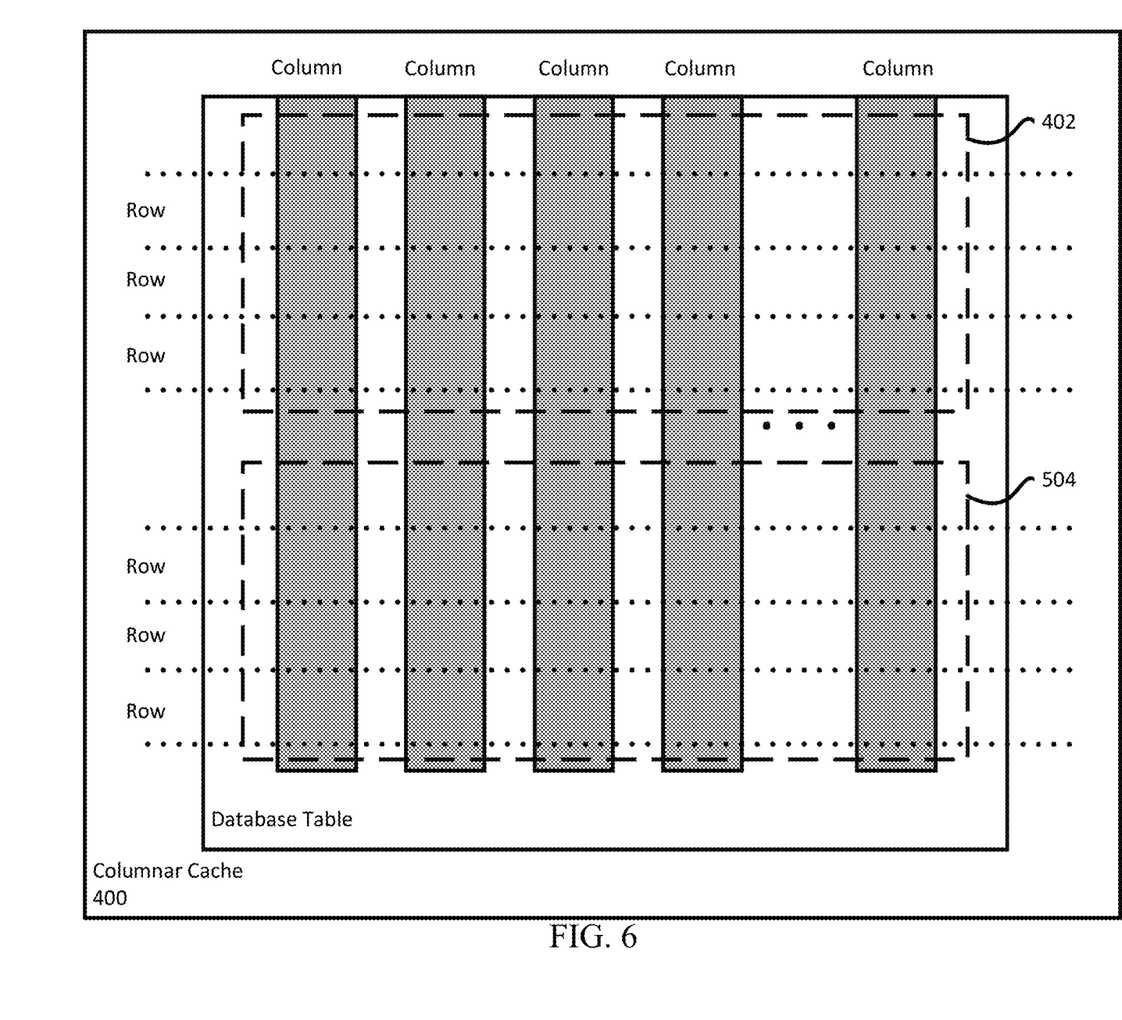
FIG. 6 depicts the example columnar cache with refreshed data replacing the invalidated data according to aspects of the disclosure.

As shown in block 330, once effectiveness of the columnar cache 110 decreases enough, the cache consistency engine 101 refreshes the columnar cache 110 with the latest committed data. FIG. 6 depicts the example columnar cache 400 with refreshed data 504 replacing the invalidated data 404, previously illustrated in FIG. 5 with a cross. As more data gets invalidated in the columnar cache 110, due to modifications of data based on transactions performed, effectiveness of the columnar cache 110 can decrease such that the query planner 135 or query execution engine 120 stops choosing the columnar cache 110 for serving queries 108. The query planner 135 or query execution engine 120 stops choosing the columnar cache 110 when the columnar cache 110 is not performing any better than the row store in the database 130. For example, the columnar cache 110 may not perform any better than the row store when more than a threshold percentage of blocks, such as more than 50% of the blocks, are invalid in the columnar cache 110. The query planner 135 can estimate a cost value of fetching the invalid blocks from the columnar cache 110 and patching the result set of the read query. The query planner 135 can estimate or otherwise determine cost values based on a summation of predefined costs for each operation. If the cost value of fetching invalid blocks from the columnar cache 110 is above a threshold or the cost value is higher than a cost value for fetching the data entirely from the row store, the query planner 135 will not choose the columnar cache 110. When the query planner 135 or query execution engine 120 does not choose the columnar cache 110 for a predetermined number of times, for example 5 times based on a balance between miscounts and avoiding thrashing, the cache consistency engine 101 refreshes the data in the columnar cache 110. This refresh can be transparent to ongoing queries 108. As part of the refresh, the latest committed data can be populated while the queries 108 are still using the old data that was previously populated in the columnar cache 110. When all the queries 108 transition to use the newly populated data, old data can be removed from the columnar cache 110. The cache consistency engine 101 can perform the refresh periodically in the background as transactions are occurring. The cache consistency engine 101 can also independently refresh individual blocks of data, individual table fragments, or refresh the entire columnar cache 110.

Figure 7:
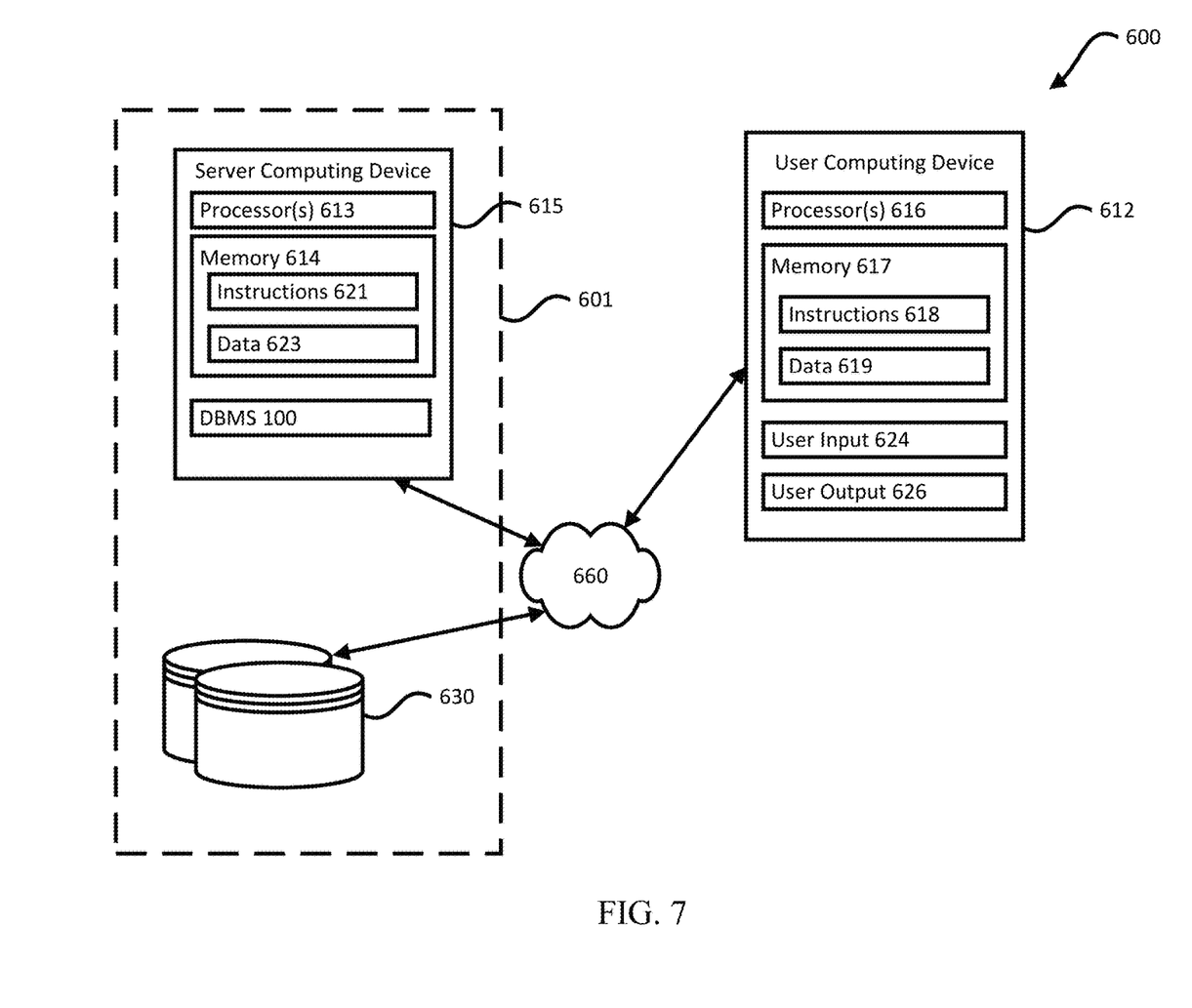
FIG. 7 depicts a block diagram of an example computing environment implementing the DBMS that maintains transactional consistency in a columnar cache according to aspects of the disclosure.

FIG. 7 depicts a block diagram of an example computing environment 600 implementing the DBMS 100 that maintains transactional consistency in a columnar cache. The DBMS 100 can be implemented on one or more devices having one or more processors in one or more locations, such as in server computing device 615. User computing device 612 and the server computing device 615 can be communicatively coupled to one or more storage devices 630 over a network 660. The server computing device 615 and storage devices 630 can form part of a computing platform 601. The computing platform 601 can be a cloud computing platform, offering a variety of different services, for example for providing compute and storage resources to users of the platform.

The storage devices 630 can be a combination of volatile and non-volatile memory and can be at the same or different physical locations than the computing devices 612, 615. For example, the storage devices 630 can include any type of non-transitory computer readable medium capable of storing information, such as a hard-drive, solid state drive, tape drive, optical storage, memory card, ROM, RAM, DVD, CD-ROM, write-capable, and read-only memories.

The server computing device 615 can include one or more processors 613 and memory 614. The memory 614 can store information accessible by the processors 613, including instructions 621 that can be executed by the processors 613. The memory 614 can also include data 623 that can be retrieved, manipulated, or stored by the processors 613. The memory 614 can be a type of non-transitory computer readable medium capable of storing information accessible by the processors 613, such as volatile and non-volatile memory. The processors 613 can include one or more central processing units (CPUs), graphic processing units (GPUs), field-programmable gate arrays (FPGAs), and/or application-specific integrated circuits (ASICs), such as tensor processing units (TPUs).

The instructions 621 can include one or more instructions that when executed by the processors 613, cause the one or more processors to perform actions defined by the instructions. The instructions 621 can be stored in object code format for direct processing by the processors 613, or in other formats including interpretable scripts or collections of independent source code modules that are interpreted on demand or compiled in advance. The instructions 621 can include instructions for implementing the system 100 consistent with aspects of this disclosure. The system 100 can be executed using the processors 613, and/or using other processors remotely located from the server computing device 615.

The data 623 can be retrieved, stored, or modified by the processors 613 in accordance with the instructions 621. The data 623 can be stored in computer registers, in a relational or non-relational database as a table having a plurality of different fields and records, or as JSON, YAML, proto, or XML documents. The data 623 can also be formatted in a computer-readable format such as, but not limited to, binary values, ASCII, or Unicode. Moreover, the data 623 can include information sufficient to identify relevant information, such as numbers, descriptive text, proprietary codes, pointers, references to data stored in other memories, including other network locations, or information that is used by a function to calculate relevant data.

The user computing device 612 can also be configured similar to the server computing device 615, with one or more processors 616, memory 617, instructions 618, and data 619. The user computing device 612 can also include a user output 626, and a user input 624. The user input 624 can include any appropriate mechanism or technique for receiving input from a user, such as keyboard, mouse, mechanical actuators, soft actuators, touchscreens, microphones, and sensors.

The server computing device 615 can be configured to transmit data to the user computing device 612, and the user computing device 612 can be configured to display at least a portion of the received data on a display implemented as part of the user output 626. The user output 626 can also be used for displaying an interface between the user computing device 612 and the server computing device 615. The user output 626 can alternatively or additionally include one or more speakers, transducers or other audio outputs, a haptic interface or other tactile feedback that provides non-visual and non-audible information to the platform user of the user computing device 612.

Although FIG. 7 illustrates the processors 613, 616 and the memories 614, 616 as being within the computing devices 615, 612, components described in this specification, including the processors 613, 616 and the memories 614, 617 can include multiple processors and memories that can operate in different physical locations and not within the same computing device. For example, some of the instructions 621, 618 and the data 623, 619 can be stored on a removable SD card and others within a read-only computer chip. Some or all of the instructions and data can be stored in a location physically remote from, yet still accessible by, the processors 613, 616. Similarly, the processors 613, 616 can include a collection of processors that can perform concurrent and/or sequential operation. The computing devices 615, 612 can each include one or more internal clocks providing timing information, which can be used for time measurement for operations and programs run by the computing devices 615, 612.

The server computing device 615 can be configured to receive requests to process data from the user computing device 612. For example, the environment 600 can be part of a computing platform configured to provide a variety of services to users, through various user interfaces and/or APIs exposing the platform services. One or more services can be a machine learning framework or a set of tools for generating neural networks or other machine learning models according to a specified task and training data. The user computing device 612 may receive and transmit data specifying target computing resources to be allocated for executing a neural network trained to perform a particular neural network task.

The devices 612, 615 can be capable of direct and indirect communication over the network 660. The devices 615, 612 can set up listening sockets that may accept an initiating connection for sending and receiving information. The network 660 itself can include various configurations and protocols including the Internet, World Wide Web, intranets, virtual private networks, wide area networks, local networks, and private networks using communication protocols proprietary to one or more companies. The network 660 can support a variety of short- and long-range connections. The short- and long-range connections may be made over different bandwidths, such as 2.402 GHz to 2.480 GHz, commonly associated with the Bluetooth® standard, 2.4 GHZ and 5 GHZ, commonly associated with the Wi-Fi® communication protocol; or with a variety of communication standards, such as the LTE® standard for wireless broadband communication. The network 660, in addition or alternatively, can also support wired connections between the devices 612, 615, including over various types of Ethernet connection.

Although a single server computing device 615 and user computing device 612 are shown in FIG. 7, it is understood that the aspects of the disclosure can be implemented according to a variety of different configurations and quantities of computing devices, including in paradigms for sequential or parallel processing, or over a distributed network of multiple devices. In some implementations, aspects of the disclosure can be performed on a single device, and any combination thereof.

Aspects of this disclosure can be implemented in digital circuits, computer-readable storage media, as one or more computer programs, or a combination of one or more of the foregoing. The computer-readable storage media can be non-transitory, e.g., as one or more instructions executable by a cloud computing platform and stored on a tangible storage device.

In this specification the phrase "configured to" is used in different contexts related to computer systems, hardware, or part of a computer program, engine, or module. When a system is said to be configured to perform one or more operations, this means that the system has appropriate software, firmware, and/or hardware installed on the system that, when in operation, causes the system to perform the one or more operations. When some hardware is said to be configured to perform one or more operations, this means that the hardware includes one or more circuits that, when in operation, receive input and generate output according to the input and corresponding to the one or more operations. When a computer program, engine, or module is said to be configured to perform one or more operations, this means that the computer program includes one or more program instructions, that when executed by one or more computers, causes the one or more computers to perform the one or more operations.

While operations shown in the drawings and recited in the claims are shown in a particular order, it is understood that the operations can be performed in different orders than shown, and that some operations can be omitted, performed more than once, and/or be performed in parallel with other operations. Further, the separation of different system components configured for performing different operations should not be understood as requiring the components to be separated. The components, modules, programs, and engines described can be integrated together as a single system or be part of multiple systems.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A system comprising:
one or more processors; and
one or more storage devices coupled to the one or more processors and storing instructions that, when executed by the one or more processors, causes the one or more processors to perform operations for maintaining transactional consistency when retrieving data from a columnar cache, the operations comprising:
loading the columnar cache with a first plurality of blocks corresponding to data in a row store, each block of the first plurality of blocks comprising a group of rows and an index;
invalidating one or more blocks of the first plurality of blocks in response to data corresponding to the one or more blocks being modified in the row store; and
refreshing the columnar cache by replacing the invalidated blocks with a second plurality of blocks corresponding to the modified data in the row store without replacing valid blocks of the columnar cache.

2. The system of claim 1, wherein the first plurality of blocks comprises valid blocks corresponding to all-visible data.

3. The system of claim 1, wherein the operations further comprise performing a row store operation to retrieve modified data for an invalidated block.

4. The system of claim 3, wherein the operations further comprise prefetching the modified data from a row store.

5. The system of claim 1, wherein the operations further comprise determining to refresh the columnar cache based on an effectiveness of the columnar cache.

6. The system of claim 5, wherein an effectiveness of the columnar cache is based on the columnar cache being consistently not chosen for retrieving data a predetermined number of times.

7. The system of claim 6, wherein the columnar cache is not chosen based on a number of invalidated blocks in the columnar cache.

8. A method for maintaining transactional consistency when retrieving data from a columnar cache, the method comprising:
loading, with one or more processors, the columnar cache with a first plurality of blocks corresponding to data in a row store, each block of the first plurality of blocks comprising a group of rows and an index;
invalidating, with the one or more processors, one or more blocks of the first plurality of blocks in response to data corresponding to the one or more blocks being modified in the row store; and
refreshing, with the one or more processors, the columnar cache by replacing the invalidated blocks with a second plurality of blocks corresponding to the modified data in the row store without replacing valid blocks of the columnar cache.

9. The method of claim 8, wherein the first plurality of blocks comprises valid blocks corresponding to all-visible data.

10. The method of claim 8, further comprising performing, with the one or more processors, a row store operation to retrieve modified data for an invalidated block.

11. The method of claim 10, further comprising prefetching, with the one or more processors, the modified data from a row store.

12. The method of claim 8, further comprising determining, with the one or more processors, to refresh the columnar cache based on an effectiveness of the columnar cache.

13. The method of claim 12, wherein an effectiveness of the columnar cache is based on the columnar cache being consistently not chosen for retrieving data a predetermined number of times.

14. The method of claim 13, wherein the columnar cache is not chosen based on a number of invalidated blocks in the columnar cache.

15. A non-transitory computer readable medium for storing instructions that, when executed by one or more processors, causes the one or more processors to perform operations for maintaining transactional consistency when retrieving data from a columnar cache, the operations comprising:

loading the columnar cache with a first plurality of blocks corresponding to data in a row store, each block of the first plurality of blocks comprising a group of rows and an index;

invalidating one or more blocks of the first plurality of blocks in response to data corresponding to the one or more blocks being modified in the row store; and refreshing the columnar cache by replacing the invalidated blocks with a second plurality of blocks corresponding to the modified data in the row store without replacing the valid blocks of the columnar cache.

16. The non-transitory computer readable medium of claim 15, wherein the operations further comprise performing a row store operation to retrieve modified data for an invalidated block.

17. The non-transitory computer readable medium of claim 16, wherein the operations further comprise prefetching the modified data from a row store.

18. The non-transitory computer readable medium of claim 15, wherein the operations further comprise determining to refresh the columnar cache based on an effectiveness of the columnar cache.

19. The non-transitory computer readable medium of claim 18, wherein an effectiveness of the columnar cache is based on the columnar cache being consistently not chosen for retrieving data a predetermined number of times.

20. The non-transitory computer readable medium of claim 19, wherein the columnar cache is not chosen based on a number of invalidated blocks in the columnar cache.

* * * * *